UNITED STATES PATENT OFFICE.

FRITZ ZIMMERMANN, OF NEWARK, NEW JERSEY, ASSIGNOR TO BAKER & CO., INCORPORATED, A CORPORATION OF NEW JERSEY.

ALLOYS OF PLATINUM AND OSMIUM.

13,961. Specification of Reissued Letters Patent. Reissued Aug. 10, 1915.

No Drawing. Original No. 1,055,119, dated March 4, 1913, Serial No. 715,266. Application for reissue filed August 14, 1913. Serial No. 784,812.

*To all whom it may concern:*

Be it known that I, FRITZ ZIMMERMANN, a citizen of the German Empire, residing in Newark, in the county of Essex and State of New Jersey, have invented certain new and useful Improvements in Alloys of Platinum and Osmium, of which the following is a specification.

This invention relates to alloys of platinum and osmium which combine in a high degree the property of great hardness with tensile strength and are applicable for use in the arts, chiefly for jewelry, electrical and scientific purposes.

Heretofore platinum has been alloyed with iridium in various percentages. The higher the percentage of iridium which is added to the platinum, the greater is the resulting hardness. The highest percentage of iridium alloyed with platinum is about 30%. The alloy of platinum and iridium is known in the trade as "iridio platinum," or in short "hard platinum."

The steadily increasing demand for hard platinum, the limited supply of iridium and its high price, have created a demand for another hard alloy of platinum with a precious metal which can be supplied at less cost than the iridio platinum.

I have found by a series of practical tests that the addition of ismium to platinum greatly increases the hardness of the platinum. The percentage of osmium which has been alloyed by me with platinum varies from less than ½ of 1% to 10% or more. Alloys of platinum and osmium containing more than 10% of osmium are only workable with difficulty, while alloys containing a percentage of osmium higher than 30% are brittle and hardly workable. It was further found that by alloying platinum with osmium, as far as hardness is concerned, one part of osmium is the equivalent of 2½ parts of iridium, and that the tensile strength of the alloy is very high, so that a fine wire of platinum-osmium is more easily produced than a fine wire of iridium-platinum of the same hardness. It was further found that an alloy of platinum and osmium containing 2% of osmium and 98% of platinum can be advantageously used, for jewelry work, it being hard and tough, while alloys containing 90% to 94% of platinum and 10% to 6% of osmium will replace iridium platinum containing from 15% to 25% of iridium for contact-points in electrical apparatus. As there is very little demand for osmium, the same can be obtained at a much lower cost than the more expensive iridium, while it is in every other respect when alloyed with platinum, as regards hardness and tensile strength, the equal of iridium-platinum. The osmium-platinum alloy is also more resistant to the action of acids than platinum.

For melting platinum and osmium together, it is necessary to refine the platinum and osmium of commerce to a high degree of purity so as to remove from the platinum the small quantities of metals of the platinum group and other impurities, and the impurities contained in the osmium. It is well known that platinum, as found in nature, contains osmium as well as other metals of the platinum group; also copper and iron, but it is impossible to make use of this natural product as an alloy, as the presence of the other metals impairs the good properties of the osmium-platinum alloy.

The new alloy herein described, which is obtained by melting together refined platinum and refined osmium, combines great tensile strength with hardness and ductility, and is thereby adapted in a high degree for application in the arts.

I claim:

Alloys of platinum and osmium, containing refined platinum and refined osmium in the proportion of less than ½% to 30%.

In testimony that I claim the foregoing as my invention, I have signed my name in presence of two subscribing witnesses.

FRITZ ZIMMERMANN.

Witnesses:
C. P. GOEPEL,
A. BLUM.